United States Patent [19]

Curcuri

[11] Patent Number: 5,094,284
[45] Date of Patent: Mar. 10, 1992

[54] METHOD AND APPARATUS FOR INTEGRATED TIRE MOUNTING AND INFLATING PERFORMED AT A SINGLE STATION

[76] Inventor: Thomas J. Curcuri, 20714 Morningside Dr., Grosse Pointe Woods, Mich. 48236

[21] Appl. No.: 679,169

[22] Filed: Mar. 26, 1991

Related U.S. Application Data

[63] Continuation of Ser. No. 371,388, Jun. 23, 1989, abandoned.

[51] Int. Cl.$^5$ .......................................... B60C 25/138
[52] U.S. Cl. .................................. 157/1.17; 157/1.24
[58] Field of Search ...................... 157/1.17, 1.2, 1.22, 157/1.24, 1.26, 1.28, 1.1, 1

[56] References Cited

U.S. PATENT DOCUMENTS

| | | |
|---|---|---|
| 2,470,534 | 5/1949 | Thomas . |
| 2,488,376 | 11/1949 | Clauser . |
| 2,635,682 | 4/1953 | Rerick et al. . |
| 2,665,747 | 5/1949 | Harrison . |
| 2,900,015 | 8/1959 | Harrison . |
| 2,907,379 | 10/1959 | Tuttle . |
| 2,910,117 | 4/1956 | Lamerson . |
| 3,461,938 | 8/1969 | Mueller . |
| 3,545,463 | 12/1970 | Mueller . |
| 3,658,152 | 4/1972 | Mueller . |
| 3,978,903 | 9/1976 | Mueller et al. . |
| 4,183,392 | 1/1980 | Kane . |
| 4,420,026 | 12/1983 | Goiseau ............................. 157/1.24 |
| 4,451,963 | 6/1984 | Karr et al. . |
| 4,547,945 | 10/1985 | Lawson . |
| 4,800,944 | 1/1989 | Kane ................................. 157/1.22 |

FOREIGN PATENT DOCUMENTS 369878 11/1937 Canada .
2085818 5/1984 United Kingdom .

OTHER PUBLICATIONS

"Wheel Handling Apparatus", Disclosure, Kozlowski & Curcuri, Approx. 1983.
"Bead Seater", Disclosure, Allied Steel & Conveyor Co., Approx. 1973 to 1974.

Primary Examiner—D. S. Meislin
Attorney, Agent, or Firm—Peter D. Keefe

[57] ABSTRACT

A pneumatic tire assembly apparatus and method for performing tire soaping, tire mounting and tire inflating operations, all of which being integrated at a single station positioned at one location in the apparatus. A conveyance system transfers a wheel to a transfer pallet located at a marry station whereat a tire is married to the wheel by dropping thereonto from a chute. The transfer pallet is transferred to an integrated tire mounting and inflating station, whereupon the tire and the wheel are soaped. Next, the tire is adjusted into a predetermined position relative to the wheel by stuffers. Then, the tire is mounted to the wheel utilizing one of a number of preferred mounting and inflating heads which cause the tire beads to slip over the upper rim of the wheel. Once mounted, the tire is inflated utilizing the same mounting and inflating head. The completed pneumatic vehicle wheel may now be transferred to other stations for further processing. In the preferred embodiment, two wheels are processed simultaneously.

20 Claims, 5 Drawing Sheets

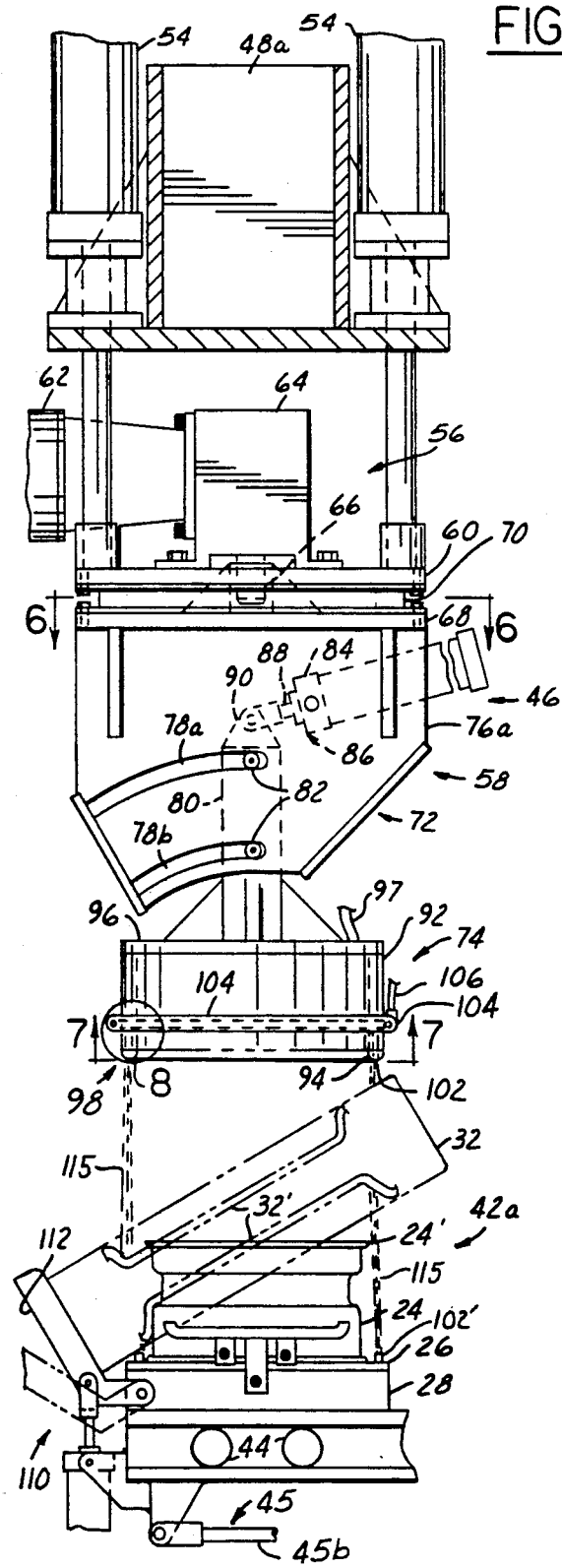
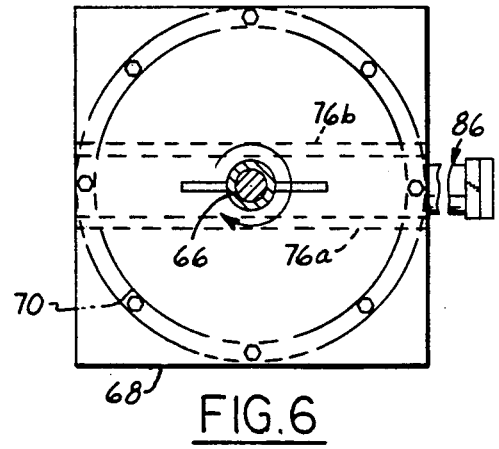
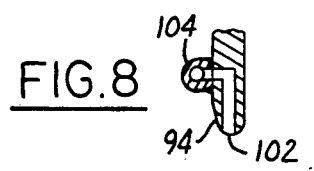
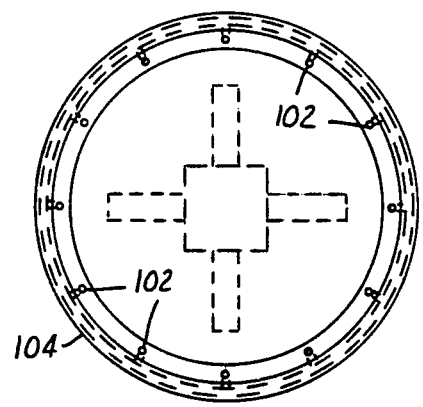
FIG. 4
FIG. 6
FIG. 8
FIG. 7

METHOD AND APPARATUS FOR INTEGRATED TIRE MOUNTING AND INFLATING PERFORMED AT A SINGLE STATION

BACKGROUND OF THE INVENTION

1. Field of the Invention

The present invention relates to contemporary tire mounting and inflating stations in which a tire is mounted to a wheel at a first station and then inflated at a second station. The present invention is more particularly related to a tire mounting and inflating apparatus in which both processes are carried out at a single station.

2. Description of the Prior Art

Vehicle assembly operations include sub-assembly operations for providing the required number of pneumatic vehicle wheels. Presently, these operations are performed by a plurality of work stations in which each detail of the operation is individually performed in sequence. Typically, the operations performed sequentially in contemporary tire mounting facilities are as follows.

A wheel is transferred to a first work station whereat a valve stem is provided on the wheel by a valve stemmer apparatus. The wheel is now prepared for transfer to the tire mounting apparatus.

Conventional tire mounting apparatus have dual roller conveyers, one each for tires and wheels, for taking the tires and wheels from a first location to an entry point in the tire mounting apparatus. Generally, the attitude of both the wheel and the tire is horizontal during the mounting and inflating processes.

The wheel is transferred via a first roller conveyer to a nest located on a pallet at an entry point of the tire mounting apparatus, whereat, frequently, a wheel soaper provides soaping of the rim of the wheel. At this same time a tire is transferred via a second roller conveyer to a tire conveyer at another entry point of the tire mounting apparatus located overhead the pallet, whereat a tire soaper provides a soaping operation on the bead of the tire. Generally, this operation is performed via a plurality of nozzles or by a wetted roller which rotates around the tire. The soap provides a lubricant during mounting of the bead of the tire onto the rim of the wheel as well as a film which can serve as a sealing agent between the rim and the bead. With soaping completed, the next step is "marrying" the tire to the wheel. This is accomplished by advancing the tire along the tire conveyer until a chute, or escapement, is encountered whereat the tire drops onto the wheel, the leading edge of the tire being low in relation to the rim of the wheel.

The pallet is now transferred to a tire mounting station. At the tire mounting station, "stuffers" push against the tread of the tire to ensure the leading edge of the tire is nestled between the upper and lower rims of the wheel. Actual mounting of the tire to the wheel is performed conventionally by one of two methods. In the first method, the wheel is locked in stationary position by clamping the wheel, then a rotating arm above the wheel rotates about the tire causing both upper and lower beads of the tire to slip over the upper rim of the wheel. In the second method, the tire and wheel move past two shoes, one shoe being located on each side of the wheel, the shoes force the tire beads to slip over the wheel rims from a given starting point as the wheel passes thereby.

The pallet is now transferred to a tire inflation station. At the tire inflation station the tire is inflated on the wheel to a first predetermined pressure. There are two conventional methods for carrying out this operation. In the first method, a large diameter steel tube descends so as to contact the tire sufficiently to separate the upper bead from the upper rim. The pallet nest for the tire and the wheel has a raised annular area which is air tight. Air under pressure is introduced into the steel tube causing the tire to internally pressurize. The steel tube is then raised, allowing the upper bead of the tire to mate with the upper rim of the wheel, thereby sealing the tire at a second predetermined pressure which is the operational pressure of the pneumatic wheel. In the second method, a first and second tube descend. The first tube descends to mate with the tire as described above with respect to the first method. The second tube, located within the first tube, descends to mate with the rim of the wheel. The space between the tubes is then subjected to air pressurization, and the tubes are then withdrawn to effect tire pressurization at the second predetermined value.

Conventional tire mounting devices may further include a tire and wheel matching operation, as well as a road simulation operation. In the tire and wheel matching operation, which occurs after tire mounting and before tire inflation, visual scanners are used to ascertain the eccentricity of the wheel and the tire. Then each are relatively rotated in order to achieve a best fit. In the road simulation operation, which occurs after tire inflation, the wheel is placed on rollers which cause the tire to be rotated in a manner indicative of driving so that the tire beads may find a final seating position on the wheel rims.

Examples of the aforesaid devices include the following patents. U.S. Pat. No. 4,547,945 to Lawson, dated Oct. 22, 1985, discloses a tire and wheel matcher having a sensing mechanism and a rotating mechanism. U.S. Pat. No. 3,658,152 to Mueller, dated Apr. 25, 1972, discloses a soaping apparatus incorporating a rotating roller for soaping the tire beads. U.S. Pat. No. 3,545,463 to Mueller, dated Dec. 8, 1970, discloses a tire mounting apparatus of the second type discussed above. U.S. Pat. No. 2,907,379 to Tuttle, dated Oct. 6, 1959, discloses another tire mounting apparatus of the second type discussed above. U.S. Pat. No. 2,665,747 to Harrison, dated Jan. 12, 1954, discloses yet another tire mounting apparatus of the second type discussed above. U.S. Pat. No. 2,470,534 to Thomas, dated May 17, 1949, discloses a tire mounting device of the first type discussed above. Great Britain Patent 2,085,818 to Goiseau, published May 2, 1984, discloses an automatic machine that fits a tire onto a wheel, where the wheel rim height is maintained at a predetermined value with respect to its conveyer apparatus. U.S. Pat. No. 3,978,903 to Mueller et al, dated Sept. 7, 1976, discloses a tire inflator apparatus of the second type discussed above. U.S. Pat. No. 4,183,392 to Kane, dated Jan. 15, 1980, discloses another tire inflator of the second kind discussed above. U.S. Pat. No. 2,910,117 to Lamerson, dated Oct. 27, 1959 discloses a tire inflator apparatus of the first type discussed above. U.S. Pat. No. 2,900,015 to Harrison, dated Aug. 18, 1959, discloses another tire inflator of the first kind discussed above. U.S. Pat. No. 3,461,938 to Mueller, dated Aug. 19, 1969, discloses a tire mounting and inflating system in which the operations are performed successively at different stations, the tire mounting apparatus being of the second kind discussed above and the tire inflation apparatus being of the second kind discussed above. U.S. Pat. No. 2,635,682 to Rerick et al, dated Apr. 21, 1953, and U.S. Pat. No. 2,488,376 to Clauser, dated Nov. 15, 1949, each disclose a tire and wheel assembly apparatus in which a locking ring is installed on the rim after the tire has been mounted.

All the aforesaid tire mounting and inflating devices suffer from significant disadvantages. The soaping station is located considerably upstream from the mounting station resulting in the soap liquids evaporating before the mounting operation commences, let alone concludes. A considerable amount of floor space must be dedicated to separate stations for soaping, mounting and inflating. Machine complexity is exacerbated by the need to transfer the wheel and tire from station to station, as well as the need to provide independent machinery for each of the separate operations performed at each station.

Clearly, what is required is a fast, efficient, reliable tire soaper, mounter and inflator apparatus that is integrated at a single station.

SUMMARY OF THE INVENTION

The present invention is an apparatus and method for performing tire soaping, mounting and inflating operations, the operations being integrated at a single station positioned at one location in the apparatus.

Briefly, the method is as follows. A conveyance system transfers a wheel to a transfer pallet whereat a tire is married to the wheel by dropping thereonto from a chute. The transfer pallet is transferred to the integrated operations work station, whereupon, firstly, the tire and the wheel are soaped. Next, the tire is adjusted into a predetermined position relative to the wheel by stuffers. Then, the tire is mounted to the wheel utilizing one of a number of alternative mounting devices which cause the tire beads to slip over the upper rim of the wheel. Once mounted, the tire is inflated utilizing an inflator device which is integrally associated with its respective mounting device. The completed pneumatic vehicle wheel may now be transferred to other stations for further processing. In the preferred embodiment, two wheels are processed simultaneously.

Briefly, the apparatus is as follows. Wheel stemming is performed in a separate operation in a conventional manner. One conveyer transfers wheels to an entry station of the apparatus, the wheel loader. At the wheel loader, the wheel rests horizontally and is transferred by conveyer to a nest located upon a transfer pallet. The transfer pallet is located at a marry station. A second conveyer transfers tires to another entry station of the apparatus which conveys the tires to a chute, or escapement, located at the marry station whereat the tire is married to the wheel. Two wheels are preferred to be situate on the transfer pallet so that simultaneous operations may be performed on the two wheels as an aid to speeding the operation. The transfer pallet is then transferred to the integrated mounting and inflating station.

Tire mounting and inflating at the integrated tire mounting and inflating station is preferred to be accomplished by any of the following four systems, in which tire stuffers are used to adjust the position of the tire on the wheel prior to the actual mounting operation.

a) Swash Plate System

In the Swash Plate System, an air tight cylinder having an annular rim facing the tire is used to both mount and inflate the tire in successive operations. Firstly, soap is applied to the tire and wheel via a soaper apparatus, preferably through a plurality of annularly arranged nozzles. The cylinder is caused, through a cammed hydraulic mechanism, to orient the annular rim off axis with respect to a central axis, then descend toward the tire and rotate about the central axis. Both beads of the tire are thereby caused to slip over the upper rim of the wheel. Next the annular rim is re-oriented on axis and then lowered to contact the tire at all locations of the sidewall. Air under pressure is introduced into the cylinder inflating the tire. The cylinder is thereupon withdrawn, resulting in a completed mounting-inflating operation.

b) Pseudo Swash Plate System

In the Pseudo Swash Plate System, a vertically movable air tight cylinder having an annular rim facing the tire is used to inflate the tire, while a plurality of annularly spaced hydraulic cylinders connected with the cylinder are used, by sequential actuation, to mount the tire. After soaping, the hydraulic cylinders are sequentially actuated so as to cause the tire to mount onto the wheel. Thereupon, the hydraulic cylinders are withdrawn and the annular rim is caused to descend so as to contact the sidewall of the tire at all points and the tire is inflated. The cylinder is thereupon withdrawn, resulting in a completed mounting-inflating operation.

c) Rocker Mounter System

In the Rocker Mounter System, a vertically movable air tight cylinder having an annular rim facing the tire is caused to pivot in an arc, starting with the low point of the tire, to cause mounting of the tire after soaping has been performed. Next, the cylinder is lowered onto the tire so as to contact the sidewall at all points and the tire is inflated. The cylinder is thereupon withdrawn, resulting in a completed mounting-inflating operation.

d) Rotary Mounter System

In the Rotary Mounter System, a vertically movable air tight cylinder having an annular rim has connected internally therewith a rotary mounter. After soaping, the internal rotary mounter descends to contact the low point of the tire, then the rotary mounter is actuated to rotate around the tire causing the beads to slip over the upper rim of the wheel. Next, the rotary mounter is retracted and the annular rim caused to contact the sidewall at all locations and the tire is thereupon inflated. The cylinder is thereupon withdrawn, resulting in a completed mounting-inflating operation.

After the integrated mounting and inflating station has completed its task, the completed vehicle wheel is transferred to an exit conveyer for further processing as required.

Accordingly, it is an object of the present invention to provide a method and apparatus for integrating tire mounting and inflating operations in a single station.

It is another object of the present invention to provide a method and apparatus for integrating tire mounting, inflating and soaping operations in a single station.

It is an additional object of the present invention to provide a method and apparatus for integrated tire mounting and inflating, where the mounting and inflating operations occur via a Swash Plate System.

It is yet another object of the present invention to provide a method and apparatus for integrated tire mounting and inflating, where the mounting and inflating operations occur via a Pseudo Swash Plate System.

It is still another object of the present invention to provide a method and apparatus for integrated tire mounting and inflating, where the mounting and inflating operations occur via a Rocker Mounter System.

It yet an additional object of the present invention to provide a method and apparatus for integrated tire mounting and inflating, where the mounting and inflating operations occur via a Rotary Mounter System.

It is yet a further object of the present invention to provide a method and apparatus for integrated tire mounting and inflating in which centering of the wheel is performed only once.

It is still a further object of the present invention to provide a method and apparatus for integrated tire mounting and inflating that is reliable, cost effective, readily serviced, structured for high volume operation, and configured to minimize required shop floor space.

These, and additional objects, advantages, features and benefits of the present invention will become apparent from the following specification.

BRIEF DESCRIPTION OF THE DRAWINGS

FIG. 4 a detail part sectional side view of the integrated tire mounting and inflating station of FIGS. 1 and 2, seen along lines 4—4 in FIG. 3.

FIG. 6 is a part sectional detail view of the lower platen of the head assembly according to the present invention, seen along lines 6—6 in FIG. 4.

FIG. 7 is a detail bottom view of the cylinder and soaper apparatus according to the present invention, seen along lines 7—7 in FIG. 4.

FIG. 8 is a detail part sectional view of the tire soaper according to the present invention, as seen by circle 8 in FIG. 4.

DETAILED DESCRIPTION OF THE PREFERRED EMBODIMENTS

Figure 1:
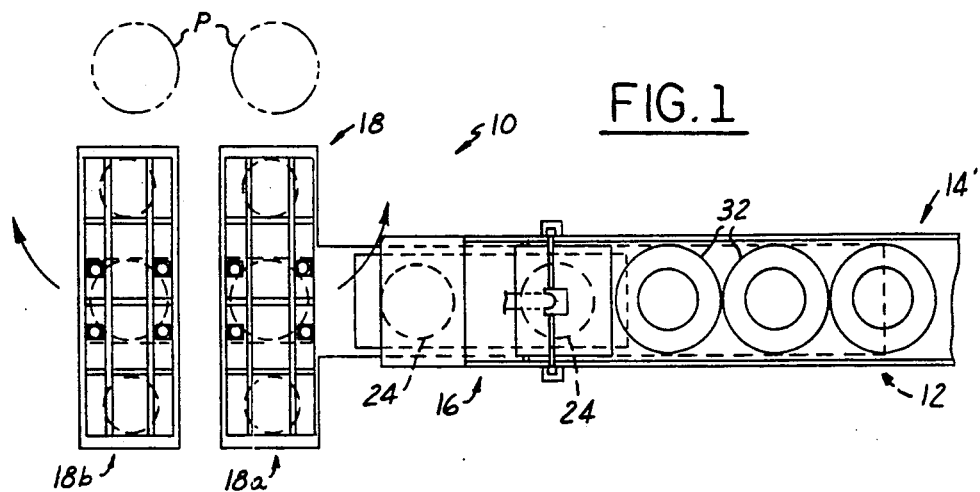
FIG. 1 is a plan view of the integrated tire mounter and inflator apparatus according to the present invention.

Referring now to the Drawing, the apparatus according to each of the preferred embodiments of the present invention will be detailed, followed by the method associated therewith.

Figure 2:
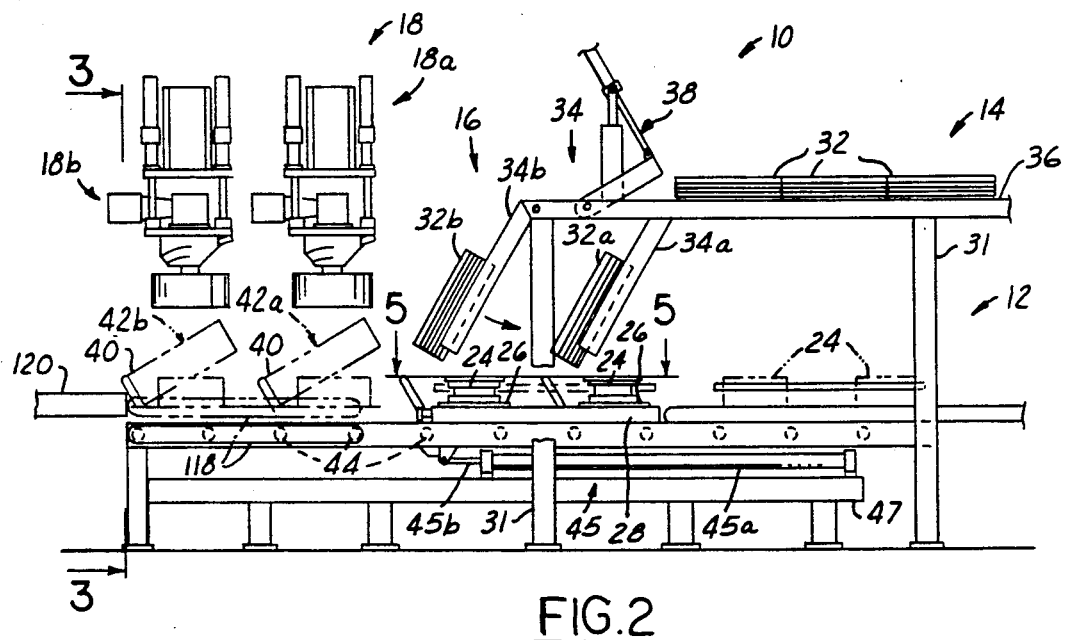
FIG. 2 is a side view of the integrated tire mounter and inflator apparatus of FIG. 1, showing an integrated tire mounting and inflating station having a Swash Plate System according to the present invention.

FIGS. 1 and 2 show, generally, the pneumatic vehicle wheel processing apparatus 10 according to the present invention. The pneumatic vehicle wheel processing apparatus includes several integral components: a wheel loader station 12, a tire transfer station 14, a marry station 16, and an integrated tire mounting and inflating station 18 which includes a soaper apparatus which will be discussed later. As can be further seen from FIGS. 1 and 2, the pneumatic vehicle wheel processing apparatus 10 is preferred to have two integrated tire mounting and inflating stations, one inboard 18a and one outboard 18b, so as to maximize machine efficiency. It is within the contemplation of the present invention to have more or less than two tire mounting and inflating stations, as may be most desirable per a particular installation.

Figure 3:
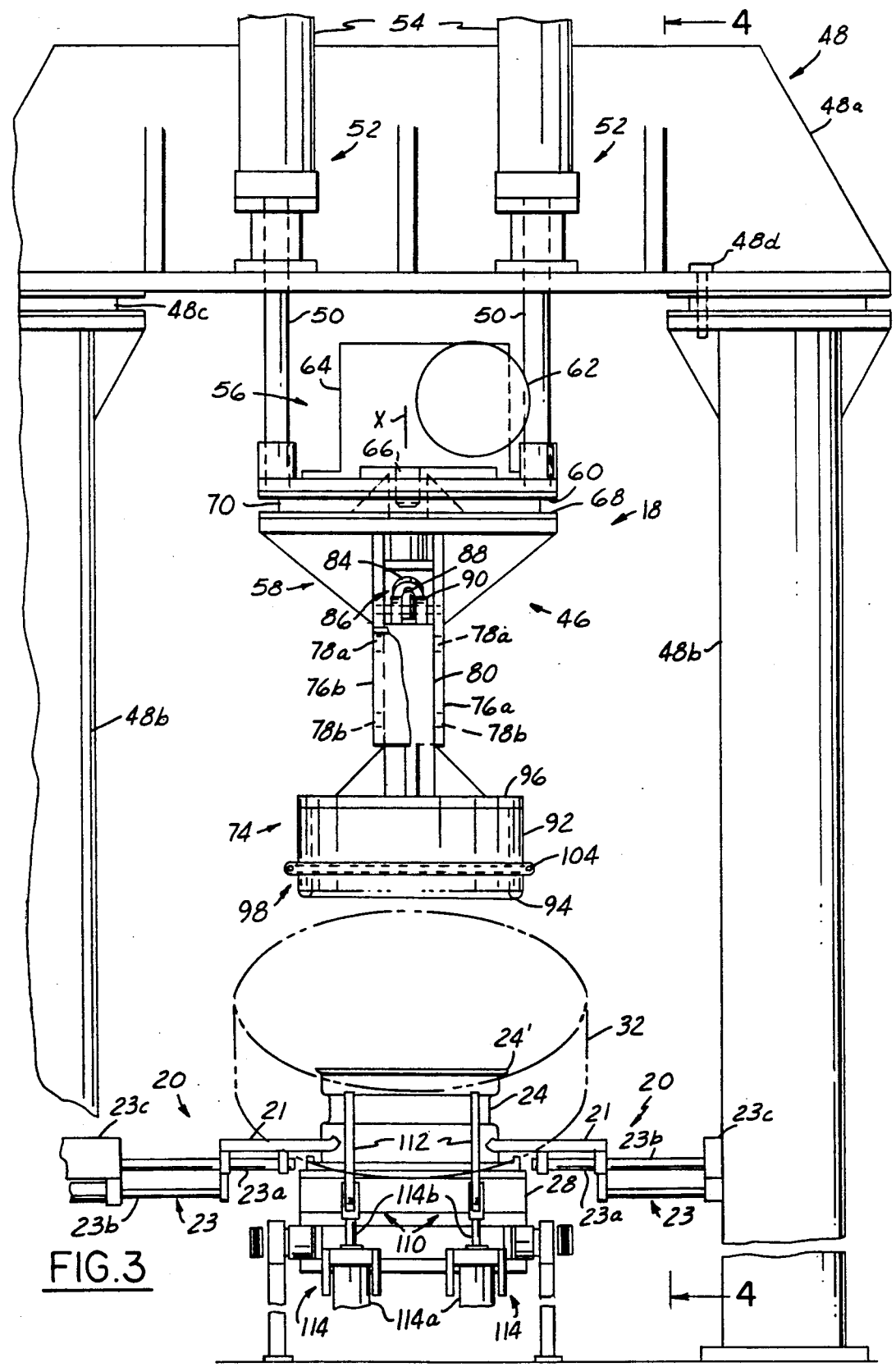
FIG. 3 is a part sectional frontal view of the integrated tire mounting and inflating station of FIGS. 1 and 2, seen along lines 3—3 in FIG. 2.
Figure 9:
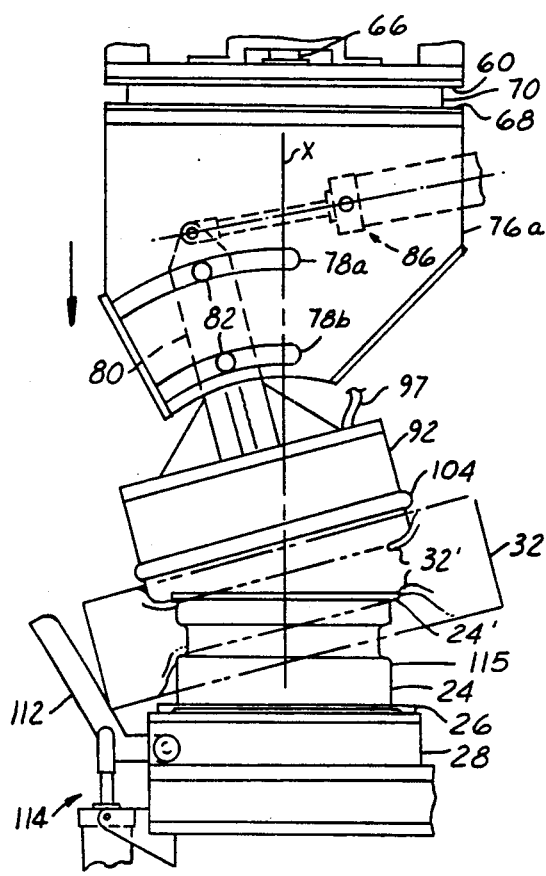
FIG. 9 is a detail side view of the Swash Plate System of FIG. 2 in an initial stage of the tire mounting process.
Figure 10:
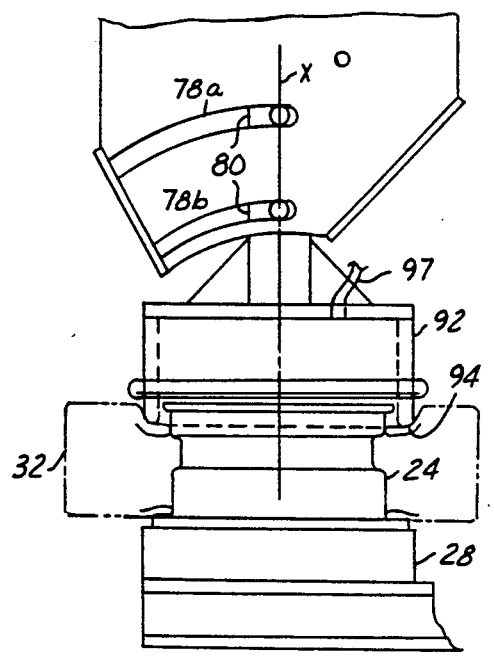
FIG. 10 is a detail side view of the Swash Plate System, as seen in FIG. 9, now in the tire inflating position.

From a first external conveyer (not shown), wheels 24, which have been previously valve stemmed at an external conventional valve stemming operation (not shown), are transferred to a first entry point of the pneumatic vehicle wheel processing apparatus 10, designated as the wheel loader station 12. The wheel loader station functions in a manner similar to prior art tire mounting systems described hereinabove. Opposing clamps approach either side of a wheel 24 deposited therein from the first external conveyer. The wheel is then lifted slightly by a transfer device and transferred to a nest 26 on a transfer pallet 28. The clamps thereupon disengage and return to their prior location. This process is repeated twice so that two wheels are transferred to the transfer pallet 28, one in front of the other, and each in a horizontal attitude. Grip clamps 20, which are located adjacent the nest, as shown in FIG. 3, thereupon engage the wheel so as to prevent any movement of the wheel with respect to the transfer pallet 28. During this process, the transfer pallet is located in the marry station 16.

A second external conveyer (not shown) transfers tires to a second entry point of the pneumatic vehicle wheel processing apparatus 10, designated as the tire transfer station 16. The tire transfer station functions in a manner similar to prior art tire mounting systems described hereinabove, wherein the tire transfer station 14 is located vertically above the wheel loader station 12 via support columns 31. A tire 32 is conveyed to a chute (or escapement) system 34 at the marry station 16, where it will drop to marry a respective wheel 24. To accomplish this, the tires are lined up along a tire conveyer 36 that conveys the tires, in pairs, to two chutes 34a and 34b; one chute being provided for each of the tires 32a and 32b of the pair. Each of the chutes 34a and 34b are pivotally mounted, and a fluidic actuator 38 is connected with the chutes so that they may be selectively pivoted as necessary to accommodate transfer of the tires. In this regard, chute 34a must periodically be pivoted to the horizontal to permit tire 32b to reach chute 34b. Further in this regard, chute 34b must be periodically pivoted upwardly to accommodate passage of tire 32a, now married to its wheel, when the transfer pallet 28 is translated to the integrated tire mounting and inflating station. All of the aforesaid operations are timed to ensure each operation occurs in a minimal time interval without interference with any other operation. When each married tire and wheel 42a and 42b, as can be seen in phantom at the integrated tire mounting and inflating station 18 in FIG. 2, the tires lay on the wheel after being deposited by the chute system 34 with their leading edge 40 low in relation to the wheel.

The apparatus to accomplish the foregoing machine operations are presently well understood in the prior art, and are described here only in so far as is necessary to describe transferring a married tire and wheel to the integrated tire mounting and inflating station 18.

The transfer pallet 28 is now translated over rollers 44 by actuation of a fluidic actuator 45 so that each of the two married tire and wheels 42a and 42b are located, respectively, in one of the two identical integrated tire mounter and inflator stations 18a and 18b, as shown in phantom in FIG. 2. The cylinder 45a of the fluidic actuator 45 is connected with the main frame 47 of the pneumatic vehicle wheel processing apparatus 10, and the piston rod 45b thereof is connected to the underside of the transfer pallet 28.

As can be best discerned from FIG. 3, each of the integrated tire mounting and inflating stations incorporates a head 46 which vertically depends from a head support structure 48 at a bridge 48a thereof. Particularly in this regard, the head 46 is connected to each of the piston rods 50 of a pair of mutually spaced apart fluidic actuators 52, the cylinders 54 of the fluidic actuators being connected with the bridge 48a of the head support structure 48. The fluidic actuators selectively control vertical movement of the head 46 with respect to the transfer pallet 28. It is preferred to connect the bridge 48a to columns 48b of the head support structure 48 so that the bridge may be selectively rotated 180 degrees on a bearing 48c. This feature minimizes the possibility of down-time by allowing a user to unlock the bridge by removing a pin 48d, then rotate the bridge 48a on the bearing 48c so that the head 46 is now positioned above a temporary married tire and wheel delivery line, in the event of a malfunction in the main body of the apparatus 10. This rotated position P of the heads is shown in phantom in FIG. 1 for each of the integrated tire mounting and inflating stations.

The foregoing features are common to the heads of each of the preferred embodiments of the integrated tire mounting and inflating stations 18 according to the present invention. Further discussion of the integrated tire mounting and inflating stations will be relative to the various embodiments thereof, as enumerated in the Summary of the Invention, above.

THE SWASH PLATE SYSTEM

The Swash Plate System of the integrated tire mounting and inflating station 18 is the preferred alternative embodiment of the apparatus 10 according to the present invention, shown particularly in FIGS. 1 through 10.

Referring firstly to FIGS. 3 and 4, it will be seen that the head 46 is composed of two components, a non-rotary head component 56 and a rotary head component 58. The non-rotary head component 56 is connected at one end to the piston rods 50 and terminates at the opposite end in an upper platen 60. Above the upper platen is located a motor 62 with an associated gear box 64 from which a vertical shaft 66 extends, passing through the center of the upper platen. The rotary head component 58 has at one end a lower platen 68; the shaft 66 passes through the center of the lower platen and is secured to the rotary head component. The shaft 66 defines a central axis X about which the rotary head component 58 rotates when the motor 62 is operating. The upper and lower platens 60 and 68 are separated by a rotary bearing 70 which allows the rotary head component to rotate with respect to the non-rotary head component with a minimum of play and friction. The lower platen 68 has connected to it a cammed hydraulic mechanism 72, which, in turn, is connected to a tire mounter and inflator apparatus 74.

The cammed hydraulic mechanism 72 has two side plates 76a and 76b, each of which connecting to the lower platen 68. Each of the two side plates has a pair of mutually spaced apart curved cam slots, an upper cam slot 78a and a lower cam slot 78b. The cam slots curve from the central axis area downwardly away from the bridge 48a and terminate at a location remote from the central axis. Sandwiched between the two side plates is a mounting block 80. The mounting block has fastened thereto four cam bearings 82 which are spaced so as to be each received by a respective cam slot. The cylinder 84 of a fluidic actuator 86 is pivotally connected with the two side plates, and is located therebetween. The piston rod 88 of the fluidic actuator 86 is pivotally connected to the upper end 90 of the mounting block 80. When the fluidic actuator is actuated so that the piston rod stroke varies, the mounting block is caused to move arcingly as the cam bearings 82 follow their respective cam slots 78a and 78b.

The tire mounter and inflator apparatus 74 is a cylinder 92 having an annular rim 94 facing downwardly toward the transfer pallet 28. The cylinder 92 has a closed end 96 which is connected the mounting block 80. At the closed end 96 is connected a pneumatic line 97, used for the tire inflating operation. Associated with the cylinder 92 is a soaper apparatus 98. The soaper apparatus is preferred to be constructed integrally with the annular rim 94, where the annular rim has a plurality of spaced apart ports 102 through which liquid soap 115 may be sprayed downwardly toward the upper and lower tire beads 32' and the upper wheel rim 24'. This structural configuration is shown particularly in FIGS. 7 and 8, in which a tube 104 encircles the cylinder 92 in order to supply liquid soap at each of the ports 102. A supply hose 106 transfers liquid soap to the tube 104 from a remote tank (not shown).

Figure 5:
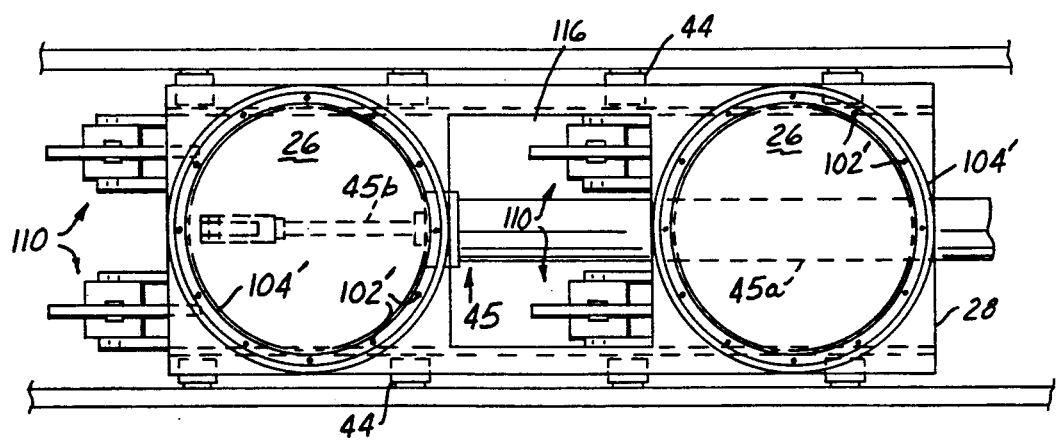
FIG. 5 is a detail plan view of the transfer pallet according to the present invention, seen along lines 5—5 in FIG. 2.

The wheel 24 lies on a nest 26 of the transfer pallet 28. The nest includes a soaper apparatus 98' having a circular tube 104' which encircles the wheel and has provided therein a plurality of spaced apart ports which allow liquid soap 115 to be sprayed upwardly toward the upper and lower beads 32' of the tire 32 and the upper rim 24' of the wheel 24. The grip clamp 20 secures against the sides of the wheel in order to hold it stationary on the nest 26 during the tire mounting operation. As shown in FIG. 3, the grip clamp 20 is composed of two opposing components located adjacent the nest 26. Each component of the grip clamp 20 includes an arm 21 which selectively contacts the side of the wheel by action of a fluidic actuator 23, the rod 23a of which being connected with the arm 21 and the cylinder 23b of which being connected with a mounting member 23c which, in turn, connects with the main frame 47. Located adjacent the nest are a pair of mutually spaced apart stuffers 110. Each stuffer includes a shoe 112 which is pivotally connected with the transfer pallet. Each shoe is structured to bias against the tread of the tire so as to cause the tire to snug against its respective wheel at its low end, via operation of a fluidic actuator 114, the cylinder 114a of which being pivotally connected with the transfer pallet 28, and the piston rod 114b of which being connected with the shoe. FIG. 5 shows the relative placement of the aforementioned components, and further shows a cut out 116 in the transfer pallet for accommodating the stuffers associated with the inboard integrated tire mounting and inflating station 18a.

Operation of the first preferred embodiment of the invention, the Swash Plate System, will now be described according to the first preferred method for carrying out the invention.

A wheel is placed upon each of two nests on the transfer pallet. A tire is then married to each wheel. The transfer pallet is then translated on rollers by actuation of the fluidic actuator 45 so that each married tire and wheel is situate in a respective integrated tire mounting and inflating station and is gripped by the grip clamp 20. In each integrated tire mounting and inflating station the following sequence of processes occurs. Soap 115 is sprayed out of ports provided on both the nest and the annular rim of the cylinder 92 of the tire mounter and inflator apparatus 74. The fluidic actuator 86 of the cammed hydraulic mechanism 72 is actuated so as to tilt the cylinder maximally off from the central axis X along the cam slots. Also, the fluidic actuator 114 of each stuffer is actuated to position the tire snugly against the wheel. The dual fluidic actuators 52 are then actuated so as cause the cylinder 92 to lower relative to the tire, the tilt of the cylinder matching, generally, the tilt of the tire on the wheel. When the annular rim of the cylinder 92 is proximate with the tire beads, the motor is energized, causing the cylinder 92 to rotate about the central axis X. The resulting swash movement causes both the upper and lower tire beads to slip over the upper rim of the wheel. The foregoing tire mounting process is exemplified in FIG. 9. At this point the tire is mounted and the grip clamp is withdrawn from the wheel. Next, the fluidic actuator 86 of the cammed hydraulic mechanism 72 is actuated so to bring the cylinder 92 on axis with the central axis X. The dual fluidic actuators 52 are again actuated to lower the annular rim of the cylinder 92 onto the sidewall of the tire at all points. The pneumatic line 97 is then pressurized, causing the tire to inflate to a first predetermined pressure. The dual fluidic actuators 52 are again actuated to raise the cylinder 92 to its original position with the tire inflation now being at a second predetermined pressure indicative of operation of the pneumatic vehicle wheel. The foregoing inflating process is exemplified in FIG. 10. The tire is now fully mounted and inflated, forming an assembled pneumatic vehicle wheel. The pneumatic vehicle wheel is then transferred away from the integrated mounting and inflating station by a lift apparatus 118, consisting of a selectively raisable sprocket driven chain, to an exit conveyer 120. The transfer pallet is then returned to its original location at a the marry station by re-actuation of the fluidic actuator 45, and the next set of wheels and tires may thereupon be processed.

The three remaining alternative embodiments of the present invention, inclusive of apparatus and method, will be described with reference to FIGS. 11 through 16. It is understood that the difference between the alternative embodiments resides in the heads of the integrated tire mounting and inflating station, all other components and process steps remaining the same as described hereinabove.

PSEUDO SWASH PLATE SYSTEM

Figure 12:
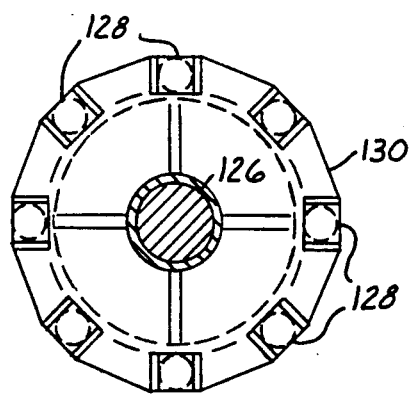
FIG. 12 is a part sectional plan view of the Pseudo Swash Plate System of FIG. 11, seen along lines 12—12 in FIG. 11.
Figure 11:
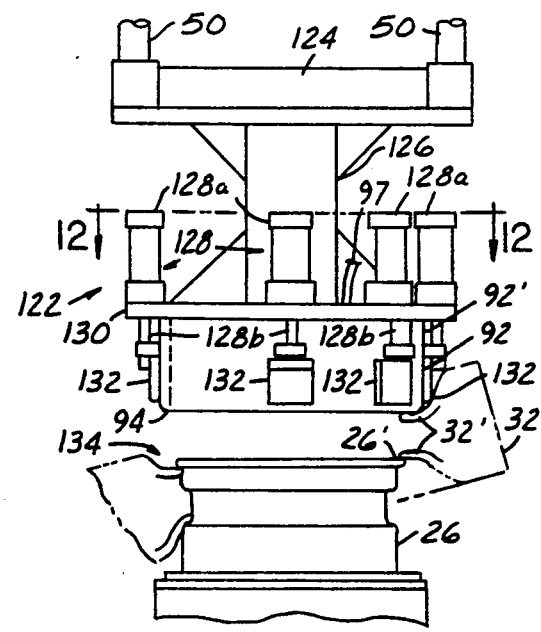
FIG. 11 is a side view of the Pseudo Swash Plate System according to an alternative embodiment of the present invention, shown about to commence tire mounting.

Referring now to FIGS. 11 and 12, the Pseudo Swash Plate System incorporates an integrated tire mounting and inflating station in which the head 122 is non-rotating and connected at an upper support structure 124 thereof to the piston rods 50 of the dual fluidic actuators 52. Spaced from and connected with the upper support structure by a connection member 126 is the cylinder 92 described hereinabove, inclusive of the soaping apparatus. Evenly spaced about the perimeter of the cylinder 92 are a plurality of fluidic actuators 128 oriented in parallel with the cylinder wall 92' of the cylinder 92. The cylinder 128a of each of the fluidic actuators 128 is connected to an annular plate 130 which is, in turn, connected to the closed end 96 of the cylinder 92. The piston rod 128b of each of the fluidic actuators 128 ends in a foot 132.

In operation according to the method of this alternative embodiment of the present invention, married tires and wheels are transferred by the transfer pallet to each of the integrated tire mounting and inflating stations, and soaping, stuffing and gripping operations are performed as described above. At each integrated mounting and inflating station the following process steps occur. The dual fluidic actuators 50 are actuated to lower the head 122 so that the annular rim 94 makes proximate contact with the upper tire bead. The fluidic actuators 128 are then actuated in sequence, starting with those adjacent the lowermost part 134 of the tire, around the tire on both sides so that the feet cause the upper and lower tire beads 32' to slip over the upper rim 26' of the wheel. The tire is now mounted and the grip clamp is withdrawn from the wheel. The fluidic actuators 128 are then actuated so that all the feet are retracted. Next, the dual fluidic actuators 50 are again actuated to lower the cylinder 92 so that the annular rim makes contact at all locations with the sidewall of the tire. The pneumatic line is then pressurized, thereby inflating the tire to the first predetermined pressure. The dual fluidic actuators 50 are then re-actuated to raise the head and its associated cylinder 92 to its original position. The tire is now fully mounted and inflated resulting in a completed pneumatic vehicle wheel. The pneumatic vehicle wheels are then transferred to the exit conveyer as described above, and the next married tires and wheels are ready to be processed.

THE ROCKER MOUNTER SYSTEM

Figure 13:
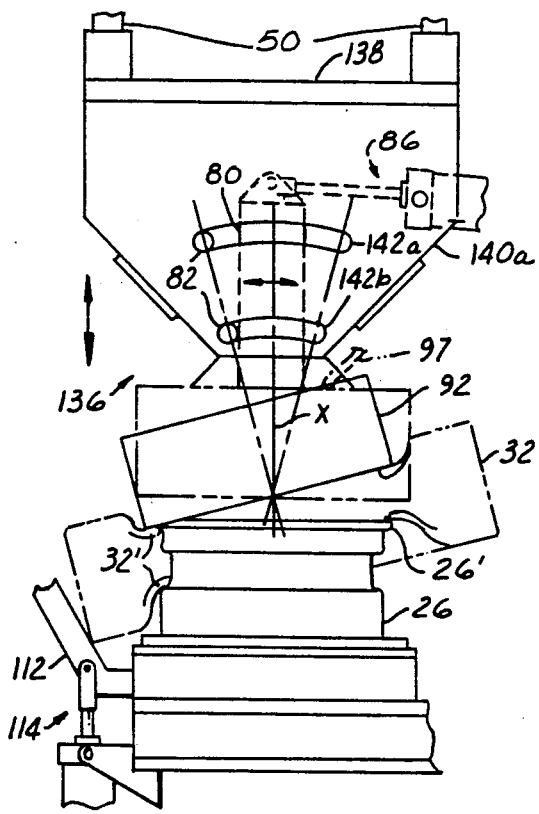
FIG. 13 is a detail side view of the Rocker Mounter System according to another alternative embodiment of the present invention, shown at an initial stage of mounting a tire.

Referring now to FIG. 13, the Rocker Mounter System incoporates an integrated tire mounting and inflating station in which the head 136 is non-rotating and connected at an upper support structure 138 thereof to the piston rods 50 of the dual fluidic actuators 52. Connected with the upper support structure are two mutually spaced apart side plates 140a and 140b (140b not being visible in FIG. 13) which are similar to those discussed above relative to the Swash Plate System. However, here the upper and lower cam slots 142a and 142b are curved downwardly on both sides of the central axis X. The cylinder 92 of the Swash Plate System is connected with respect to the side plates 140a and 140b via the mounting block 80 and cam bearings 82 as hereinabove described with respect to the Swash Plate System. Further as in the Swash Plate System, a fluidic actuator 86 is used to move the mounting block as defined by the interaction of the cam bearings and the cam slots.

In operation according to the method of this alternative embodiment of the present invention, married tires and wheels are transferred by the transfer pallet to each of the integrated tire mounting and inflating stations and soaping, stuffing and gripping operations are performed as described above. At each integrated mounting and inflating station the following process steps occur. The fluidic actuator 86 is actuated to cause the cylinder 92 to assume an attitude of tilt with respect to the central axis X an amount similar to that of the tire with respect to the wheel. The dual fluidic actuators 50 are then actuated to lower the head 136 so that the annular rim 94 makes proximate contact with the tire sidewall at the upper bead. The fluidic actuator 86 is then actuated so that the cam bearings move to the opposite end of the cam slots so as to cause the annular rim to force the upper and lower tire beads 32' to slip over the upper rim 26' of the wheel. The tire is now mounted and the grip clamp is withdrawn from the wheel. The fluidic actuator 86 is again actuated so that the cylinder 92 is brought into alignment with the central axis X. Next, the dual fluidic actuators 50 are again actuated to lower the cylinder 92 so that the annular rim makes contact at all locations with the sidewall of the tire. The pneumatic line 97 is then pressurized, thereby inflating the tire to the first predetermined pressure. The dual fluidic actuators 50 are then re-actuated to raise the head and its associated cylinder 92 to its original position. The tire is now fully mounted and inflated resulting in a complete pneumatic vehicle wheel. The pneumatic vehicle wheels are then transferred to the exit conveyer as described above, and the next married tires and wheels are ready to be processed.

THE ROTARY MOUNTER SYSTEM

Figure 14:
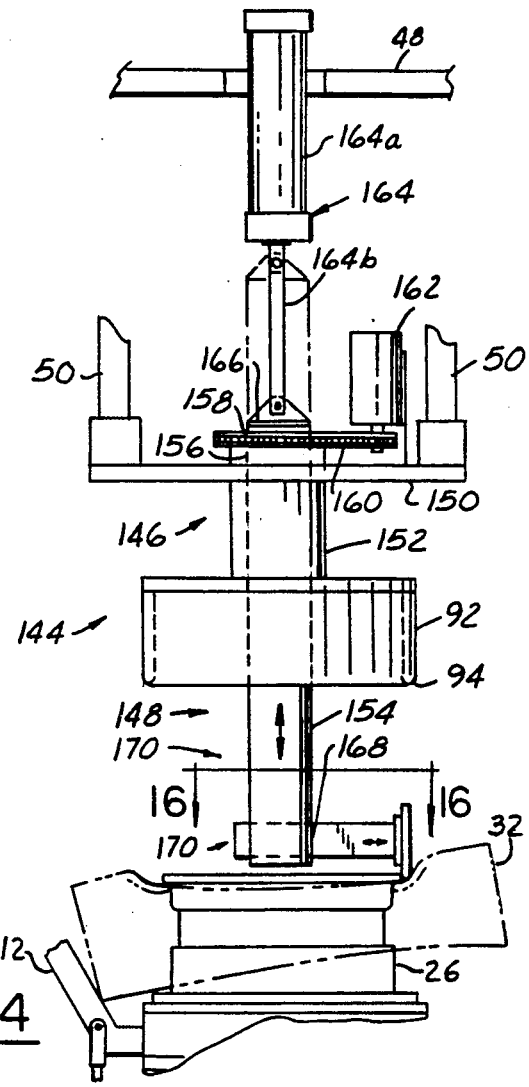
FIG. 14 is a detail side view of the Rotary Mounter System according to yet another alternative embodiment of the present invention, showing the rotary mounter in an extended position in which mounting of a tire onto a wheel is underway.
Figure 16:
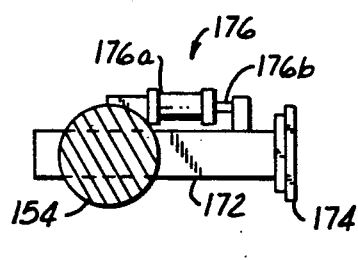
FIG. 16 is a detail part sectional plan view of the rotary mounter, seen along lines 16—16 in FIG. 14.
Figure 15:
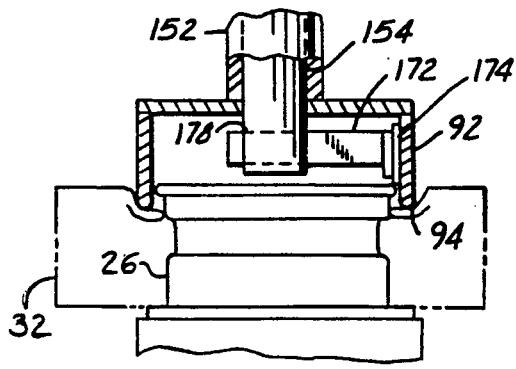
FIG. 15 shows a detail side view of the the Rotary Mounter System of FIG. 14, now with the rotary mounter in a retracted position so that the annular rim of the cylinder may contact the sidewall of the tire at all locations.

Referring now to FIGS. 14 through 16, the Rotary Mounter System incorporates an integrated tire mounting and inflating station in which the head 144 has a non-rotary component 146 and a rotary component 148. The non-rotary component 146 is connected, via an upper support structure 150 thereof, to the piston rods 50 of the dual fluidic actuators 52. Spaced from and connected with the upper support structure by a hollow connection member 152 is the cylinder 92 described hereinabove, inclusive of the soaping apparatus. A mounter shaft 154 fits bearingly in the hollow of the connection member 152. The upper end 156 of the mounter shaft has a sprocket 158 for engaging a chain 160 which also engages a motor 162 connected with the non-rotary component 146. The cylinder 164a of a fluidic actuator 164 is connected to the head support structure 48, while the piston rod 164b thereof is connected with the upper end 156 of the mounter shaft 154. So that the mounter shaft may rotate in response to energization of the motor, but yet not cause rotation of the fluidic actuator 164, a bearing 166 is provided that permits the fluidic actuator to vertically move the mounter shaft. At the lower end 168 of the mounter shaft 154 is located a mounter 170. The mounter includes a horizontal extension member 172 that terminates in a roller 174. The cylinder 176a of a fluidic actuator 176 is connected with the mounter shaft 154 and the piston rod 176b thereof is connected with the extension member. The extension member 172 passes through a hole 178 in the mounter shaft 154, and actuation of the fluidic actuator 176 causes the roller 174 to be located a greater or lesser distance from the mounter shaft 154.

In operation according to the method of this alternative embodiment of the present invention, married tires and wheels are transferred by the transfer pallet to each of the integrated tire mounting and inflating stations, and soaping, stuffing and gripping operations are performed as described above. At each integrated mounting and inflating station the following process steps occur. The fluidic actuator 164 is actuated to lower the mounter 170 toward the lowermost point on the upper tire bead. Before tire contact is made, the fluidic actuator 176 of the mounter 170 is actuated to extend the roller so as to ensure that it will contact the upper tire bead. The motor is then actuated, causing the mounting shaft to rotate and the roller to rotate around the upper and lower tire beads, thereby causing both the upper and lower beads to slip over the upper rim of the wheel. The tire is now mounted and the grip clamp is withdrawn from the wheel. The fluidic actuator 164 is again actuated to raise the mounter 170 from the tire. Thereupon the fluidic actuator 176 is again actuated to retract the roller toward the mounter shaft. The end point of this step results in the mounter being nestled in the cylinder 92. The dual fluidic actuators 50 are then actuated to lower the cylinder 92 so that the annular rim 94 makes contact at all points with the sidewall of the tire. The pneumatic line is then pressurized, thereby inflating the tire to the first predetermined pressure. The dual fluidic actuators 50 are then re-actuated to raise the head and its associated cylinder 92 to its original position. The tire is now fully mounted and inflated resulting in a completed pneumatic vehicle wheel. The pneumatic vehicle wheels are then transferred to the exit conveyer as described above, and the next married tires and wheels are ready to be processed.

To those skilled in the art to which this invention appertains, the above described preferred embodiments may be subject to change or modification. In this regard, it is contemplated within the scope of the present invention to optionally include a conventional wheel-to-tire matching operation between the marry station and the integrated mounting and inflating station. Also, the term "fluidic" used hereinabove may refer to either the hydraulic or pneumatic form thereof, as may best suit a given installation environment. Such change or modification can be carried out without departing from the scope of the invention, which is intended to be limited only by the scope of the appended claims.

What is claimed is:

1. A tire mounting and inflating apparatus for mounting tires onto wheels and for inflating said tires after said tires have been mounted onto said wheels, wherein the term "mounting" is defined as the process of slipping both beads of a tire over at least one rim of a wheel to thereby trap the beads of the tire between the rims of the wheel, said tire mounting and inflating apparatus comprising:

a main frame;

wheel loader means connected with said main frame for accepting and moving said wheels;

tire transfer means connected with said main frame overhead said wheel loader means for accepting said tires and for moving said tires;

chute means connected with said tire transfer means for selectively releasing each tire of said tires so as to be married to a respective wheel of said wheels;

pallet means located on said main frame for supporting at least one said married tire and wheel;

nest means on said pallet means for supporting each wheel of said at least one married tire and wheel on said pallet means and for selectively providing an air tight seal with respect to each said tire of said at least one married tire and wheel;

gripper means connected with said main frame for selectively holding each wheel of said at least one married tire and wheel with respect to said nest means;

at least one tire mounting and inflating station connected with said main frame, each tire mounting and inflating station comprising:

a head;

bridge means adjacent said main frame for reciprocably supporting said head, said nest means being selectively located below said head;

reciprocation means connected with said head and said bridge means for selectively reciprocating said head relative to said nest means;

mounting means connected with said head and cooperating with said reciprocation means for selectively applying force to said tire to thereby cause the beads of said tire to be slipped over a rim of said wheel thereby mounting said tire onto said wheel;

said mounting means comprising a cylinder having a closed end, said closed end of said cylinder being connected with said head, said cylinder having an opposite open end;

annular rim means located at said open end of said cylinder for contacting said tire;

inflation means connected with said cylinder for selectively supplying air under pressure to said cylinder, said inflation means cooperating with said reciprocation means to inflate said tire while said annular rim means sealably contacts said tire; and translation means connected with said pallet means and said main frame for selectively translating one said married tire and wheel into each said at least one tire mounting and inflating station; and removal means connected with said main frame for removing each said married tire and wheel from each said at least one mounting and inflating station.

2. The tire mounting and inflating apparatus of claim 1, further comprising soaping means connected with each said cylinder and each said nest means for soaping each said married tire and wheel before each said tire is mounted to its respective said wheel.

3. The tire mounting and inflating apparatus of claim 2, further comprising stuffer means connected with said pallet means adjacent each said nest means for stuffing each said tire snuggly against its respective said wheel before each said tire is mounted its respective said wheel.

4. The tire mounting and inflating apparatus of claim 3, further comprising bridge rotation means connected with said bridge means for selectively rotating said bridge means so that said head may be moved from a first position adjacent said nest means to a second position remote from said nest means.

5. The tire mounting and inflating apparatus of claim 3, wherein said mounting means comprises:

rotary actuation means connected with said head and said cylinder for selectively causing said cylinder to rotate with respect to said head about a central axis oriented perpendicular with respect to said nest means; and actuation means connected with said head for selectively tilting said cylinder with respect to said central axis; said actuation means cooperating with said reciprocation means and said rotary actuation means for selectively tilting said cylinder off axis with respect to said central axis, selectively rotating said cylinder about said central axis and selectively moving said cylinder with respect to said married tire and wheel so that said annular rim means of said cylinder selectively contacts said tire of one said married tire and wheel thereby applying force on said tire to cause the beads of said tire to be slipped over a rim of said wheel thereby mounting said tire onto said wheel, and for tilting said cylinder on axis with respect to said central axis and selectively moving said cylinder relative to said married tire and wheel so that said annular rim means of said cylinder contacts said tire to permit said tire to be inflated on said wheel by said inflation means.

6. The tire mounting and inflating apparatus of claim 5, wherein said actuation means further comprises:

a pair of side plates connected with said head;

mounting block means located between each side plate of said pair of side plates for connecting said closed end of said cylinder to said head;

cam means located on said mounting block means and said pair of side plates for guiding movement of said mounting block between each said side plate of said pair of side plates; and fluid actuator means connected with said head for selectively causing said mounting block means to move as defined by said cam means.

7. A tire mounting and inflating station for mounting a tire onto a wheel and for inflating said tire after said tire has been mounted onto said wheel, wherein the term "mounting" is defined as the process of slipping both beads of a tire over at least one rim of a wheel to thereby trap both beads of the tire between the rims of the wheel, said tire being married to said wheel before said tire is mounted onto said wheel by said tire mounting and inflating station, said tire mounting and inflating station comprising:

a main frame;

pallet means located on said main frame for supporting said married tire and wheel;

nest means on said pallet means for supporting said wheel on said pallet means and for selectively providing an air tight seal with respect to said tire;

gripper means connected with said main frame for selectively holding said wheel relative to said nest means;

a head;

bridge means adjacent said main frame for reciprocably supporting said head, said nest means being selectively located below said head;

reciprocation means connected with said head and said bridge means for selectively reciprocating said head relative to said nest means;

mounting means connected with said head and cooperating with said reciprocation means for selectively applying force to said tire to thereby cause the beads of said tire to be slipped over a rim of said wheel thereby mounting said tire onto said wheel;

said mounting means comprising a cylinder having a closed end, said closed end of said cylinder being connected with said head, said cylinder having an opposite open end;

annular rim means located at said open end of said cylinder for contacting said tire; and inflation means connected with said cylinder for selectively supplying air under pressure to said cylinder, said inflation means cooperating with said reciprocation means to inflate said tire while said annular rim means sealably contacts said tire.

8. The tire mounting and inflating station of claim 7, further comprising soaping means connected with said cylinder and said nest means for soaping said tire and said wheel before said tire is mounted to said wheel.

9. The tire mounting and inflating station of claim 8, further comprising stuffer means connected with said pallet means for stuffing said tire snuggly against said wheel before said tire is mounted to said wheel.

10. The tire mounting and inflating station of claim 9, further comprising translation means connected with said pallet means and said main frame for selectively translating said tire and wheel into said tire mounting and inflating station.

11. The tire mounting and inflating station of claim 10, further comprising bridge rotation means connected with said bridge means for selectively rotating said bridge means so that said head may be moved from a first position adjacent said nest means to a second position remote from said nest means.

12. The tire mounting and inflating station of claim 11, wherein said mounting means comprises:

rotary actuation means connected with said head and said cylinder for selectively causing said cylinder to rotate with respect to said head about a central axis oriented perpendicular with respect to said nest means; and actuation means connected with said head for selectively tilting said cylinder with respect to said central axis; said actuation means cooperating with said reciprocation means and said rotary actuation means for selectively tilting said cylinder off axis with respect to said central axis, selectively rotating said cylinder about said central axis and selectively moving said cylinder with respect to said married tire and wheel so that said annular rim means of said cylinder selectively contacts said tire of one said married tire and wheel thereby applying force on said tire to cause the beads of said tire to be slipped over a rim of said wheel thereby mounting said tire onto said wheel, and for tilting said cylinder on axis with respect to said central axis and selectively moving said cylinder relative to said married tire and wheel so that said annular rim means of said cylinder contacts said tire to permit said tire to be inflated on said wheel by said inflation means.

13. The tire mounting and inflating station of claim 12, wherein said actuation means further comprises:

a pair of side plates connected with said head;

mounting block means located between each side plate of said pair of side plates for connecting said closed end of said cylinder to said head;

cam means located on said mounting block means and said pair of side plates for guiding movement of said mounting block between each said side plate of said pair of side plates; and fluid actuator means connected with said head for selectively causing said mounting block means to move as defined by said cam means.

14. The tire mounting and inflating station of claim 13, further comprising bridge rotation means connected with said bridge means for selectively rotating said bridge means so that said head may be moved from a first position adjacent said nest means to a second position remote from said nest means.

15. A swash plate system tire mounting and inflating station for mounting a tire onto a wheel and for inflating said tire after said tire has been mounted onto said wheel, wherein the term "mounting" is defined as the process of slipping both beads of a tire over at least one rim of a wheel to thereby trap both beads of the tire between the rims of the wheel, said tire being married to said wheel before said tire is mounted onto said wheel by said swash plate system tire mounting and inflating station, said swash plate system tire mounting and inflating station comprising:

a main frame;

pallet means located on said main frame for supporting said married tire and wheel;

nest means on said pallet means for supporting said wheel on said pallet means and for selectively providing an air tight seal with respect to said tire;

gripper means connected with said main frame for selectively holding said wheel with respect to said nest means;

a head;

bridge means adjacent said main frame for reciprocably supporting said head, said nest means being selectively located below said head;

reciprocation means connected with said head and said bridge means for selectively recriprocating said head relative to said nest means;

mounting means connected with said head and cooperating with said reciprocation means for selectively applying force to said tire to thereby cause the beads of said tire to be slipped over a rim of said wheel thereby mounting said tire onto said wheel;

said mounting means comprising a cylinder having a closed end, said closed end of said cylinder being connected to said head, said cylinder having an opposite open end;

rotary actuation means connected with said head and said cylinder for selectively causing said cylinder to rotate with respect to said head about a central axis oriented perpendicular with respect to said nest means;

annular rim means located at said open end of said cylinder for selectively contacting said tire;

inflation means connected with said cylinder for selectively supplying air under pressure to said cylinder; and actuation means connected with said head for selectively tilting said cylinder with respect to said central axis; said actuation means cooperating with said reciprocation means and said rotary actuation means for selectively tilting said cylinder off axis with respect to said central axis, selectively rotating said cylinder about said central axis and selectively moving said cylinder with respect to said married tire and wheel so that said annular rim means of said cylinder selectively contacts said tire thereby applying force on said tire to cause the beads of said tire to be slipped over a rim of said wheel thereby mounting said tire onto said wheel, and further cooperating with said reciprocation means and said inflation means for tilting said cylinder on axis with respect to said central axis and selectively moving said cylinder relative to said married tire and wheel so that said annular rim means of said cylinder contacts said tire to permit said tire to be inflated on said wheel by said inflation means.

16. The tire mounting and inflating station of claim 15, further comprising soaping means connected with said cylinder and said nest means for soaping said tire and said wheel before said tire is mounted to said wheel.

17. The tire mounting and inflating station of claim 16, further comprising stuffer means connected with said pallet means for stuffing said tire snuggly against said wheel before said tire is mounted to said wheel.

18. The tire mounting and inflating station of claim 17, wherein said actuation means comprises:
   a pair of side plates connected with said head;
   mounting block means located between each side plate of said pair of side plates for connecting said closed end of said cylinder to said head;
   cam means located on said mounting block means and said pair of side plates for guiding movement of said mounting block between each said side plate of said pair of side plates; and
   fluid actuator means connected with said head for selectively causing said mounting block means to move as defined by said cam means.

19. The tire mounting and inflating station of claim 17, further comprising translation means connected with said pallet means and said main frame for selectively translating said tire and wheel into said tire mounting and inflating station.

20. The tire mounting and inflating station of claim 19, further comprising bridge rotation means connected with said bridge means for selectively rotating said bridge means so that said head may be moved from a first position adjacent said nest means to a second position remote from said nest means.

* * * * *